(12) United States Patent
Kang et al.

(10) Patent No.: US 6,246,253 B1
(45) Date of Patent: Jun. 12, 2001

(54) SYSTEM FOR TESTING LIQUID CRYSTAL AND END SEAL OF LCD CELL

(75) Inventors: Eung Cheol Kang; Suk Jin Jeong; Chan Joon Yoon, all of Kyoungki-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/328,820

(22) Filed: Jun. 9, 1999

(30) Foreign Application Priority Data

Jun. 18, 1998 (KR) .................................. 98-22940

(51) Int. Cl.[7] .......................... G01R 27/26; G01R 31/00; G01J 1/32; G02F 1/01; G01N 29/04
(52) U.S. Cl. ......................... 324/770; 324/678; 250/205; 250/225; 73/603
(58) Field of Search ..................... 324/770, 678; 250/205, 225; 73/603

(56) References Cited

U.S. PATENT DOCUMENTS

| 4,379,408 | | 4/1983 | Sandhu ................................. 73/603 |
| 4,651,567 | | 3/1987 | Sandhu ................................. 73/603 |
| 4,832,460 | * | 5/1989 | Fujimura et al. ................... 349/153 |
| 4,870,357 | * | 9/1989 | Young et al. ........................ 324/770 |
| 5,012,314 | * | 4/1991 | Tobita et al. ........................ 250/205 |
| 5,309,108 | * | 5/1994 | Maeda et al. ........................ 324/501 |
| 5,561,381 | * | 10/1996 | Jenkins et al. ....................... 324/678 |
| 5,734,158 | * | 3/1998 | Nagashima et al. ................. 250/225 |
| 5,745,202 | * | 4/1998 | Yamauchi et al. ................... 349/110 |
| 5,801,545 | * | 9/1998 | Takekoshi et al. .................. 324/770 |
| 5,854,745 | * | 12/1998 | Muraoka et al. ...................... 700/58 |
| 5,994,916 | * | 11/1999 | Hayashi ............................... 324/770 |
| 5,999,012 | * | 12/1999 | Listwan ............................... 324/770 |
| 6,028,441 | * | 2/2000 | Alvord et al. ....................... 324/767 |

FOREIGN PATENT DOCUMENTS

| 08160370 | 6/1996 | (JP) | ................................. G02F/1/13 |
| 08184793 | 7/1996 | (JP) | ................................. G02F/1/13 |
| 08184855 | 7/1996 | (JP) | ............................... G02F/1/136 |
| 09054331 | 2/1997 | (JP) | .............................. G02F/1/1345 |
| 09090371 | 4/1997 | (JP) | .............................. G02F/1/1339 |
| 09090384 | 4/1997 | (JP) | .............................. G02F/1/1339 |
| 09210855 | 8/1997 | (JP) | ............................... G01M/11/00 |
| 09281515 | 10/1997 | (JP) | .............................. G02F/1/1343 |

\* cited by examiner

Primary Examiner—Safet Metjahic
Assistant Examiner—Wasseem H. Hamdan
(74) Attorney, Agent, or Firm—Ladas & Parry (57) ABSTRACT

Disclosed is a system for testing liquid crystal and end seal of liquid crystal displays. In the present invention, a test unit P for liquid crystal distribution is disposed at a side of a loading unit L. The test unit P for liquid crystal distribution is disposed orthogonal to a test unit G for end seal. Unloading units Ug, Ur, Uj of good, repair, reject are disposed in parallel by a selected distance. A robot unit R one by one to the respective testing units, is disposed between the loading and unloading units L,U. An operating panel S is installed between the test units P,G according to the test result and a monitor M displaying the liquid crystal injecting hole is installed at the operating panel S. Furthermore, the investigator may conduct two tests for liquid crystal and for end seal simultaneously at one position in front of the operating panel S.

10 Claims, 11 Drawing Sheets

SYSTEM FOR TESTING LIQUID CRYSTAL AND END SEAL OF LCD CELL

BACKGROUND OF THE INVENTION

1. Field of the Invention

The present invention relates to a system for testing liquid crystal and end seal of liquid crystal display cell, and more particularly to a system for testing distributing state of the liquid crystal being injected through a liquid crystal injecting hole and for testing coating state of end seal used for sealing the injecting hole after the liquid crystal is injected.

2. Description of the Related Art

The liquid crystal cell is generally fabricated according to the following steps of; coating a polymeric organic alignment layer between electrodes, i.e. transparent conductors being attached to respectively opposed surfaces of upper and lower glass substrates and rubbing the alignment layer; printing a thermosetting sealing material that a spacer is mixed therein, on the lower glass substrate so as to maintain a selected distance (7~10 $\mu$m) between the upper and lower glass substrates; attaching the upper glass substrate and the lower glass substrate; and curing the resultant.

There are various techniques for injecting the liquid crystal into the liquid crystal cell, such as those methods of employing yarn made of fiber material, boating and dipping.

According to the method employing yarn, sufficient amount of liquid crystal is absorbed by the yarn made of fiber materials and the yarn is inserted into a boat through a slot provided in the boat. The boat is located adjacent to a liquid crystal injecting hole formed in a liquid crystal cell. And then, the liquid crystal is injected into inner space of the liquid crystal cell according to a vacuum pressure which is preexisted in a liquid crystal injecting chamber and an absorptivity due to the capillary phenomenon.

On the other hand, according to the boating method, the liquid crystal is directly poured into the liquid crystal injecting hole without employing any yarn. According to the dipping method, the liquid crystal is injected by dipping the liquid crystal injecting hole into a tray which is filled with liquid crystal in full.

Accordingly, there are formed two liquid crystal injecting holes at a side of the liquid crystal cell. The liquid crystal is injected through the respective liquid crystal injecting holes, and then the liquid crystal injecting holes are sealed with end seal to prevent from leaking the liquid crystal. Herein, the end seal is generally coated at an outer surface of the liquid crystal injecting hole at a thick of 0.1~0.8 mm.

After the liquid crystal injecting hole is sealed with the end seal, uniformity of liquid crystal distribution in the liquid crystal cell is investigated. The reason for investigating the uniformity is because there may be occurred malfunctions when the liquid crystal is not injected uniformly into some portions of the liquid crystal cell. Further, the thickness of end seal must be limited and be uniformed in the range as mentioned above. Only by doing so, leaking of liquid crystal is prevented, and therefore the sealing condition can be investigated.

Conventionally, there are provided an equipment for testing the liquid crystal distribution and another equipment for testing end seal condition, and especially the sealing condition is investigated about the whole liquid crystal cells by means of a microscope.

However, those equipments whose testable range of cell size is limited within 12.1" will be useless since currently the size of liquid crystal cell becomes larger.

Furthermore, since those equipments are separately installed, they require two investigators, which is regarded to as wasting of manpower and there may be occurred scraps in the liquid crystal cells while transferring the liquid crystal cells from one equipment to another equipment.

Since the sealing condition is investigated about the whole liquid crystal cells by means of a microscope, the investigator has eyestrain that results in inaccuracy of the test.

SUMMARY OF THE INVENTION

Accordingly, the present invention is provided to solve foregoing problems of conventional testing systems and more specifically the present invention provides a system for testing liquid crystal and end seal of liquid crystal display cell so that various size of cells are all testable by the system.

It is another object of the present invention that one investigator can conduct two tests by accomplishing the respective tests for liquid crystal and for end seal within one system. Additionally, the scrap in the liquid crystal cells during the cell transfer is prevented by transferring them with a robot which is precisely controlled.

It is further object of the present invention to prevent the investigator's eyestrain and to improve accuracy of the test by providing an extended screen when the sealing condition is tested by the investigator.

So as to accomplish foregoing objects, a testing system according to the present invention is constituted as follows.

A test unit for distribution of liquid crystal being injected into liquid crystal cells is disposed at one side of a unit that a cassette enclosing liquid crystal cells is loaded therein. A test unit for end seal being used for sealing a liquid crystal injecting hole is disposed at one side of the liquid crystal distribution testing unit in an orthogonal position thereto. The liquid crystal cells being decided as good, repair, reject according to test results of the respective units, are selectively unloaded to three unloading units. The unloading units are disposed in parallel with the test unit for liquid crystal by a selected distance and disposed in the orthogonal position with respect to the test unit for end seal. Between the respective testing units and the unloading units, a robot unit holding a liquid crystal cell and transferring it to the respective units one by one is disposed.

The test unit for liquid crystal includes a main frame provided with a means for aligning the liquid crystal cells. Lamps are installed on a bottom of the main frame. The light of the lamps are emitted toward lower portions of the liquid crystal cells which are aligned by the aligning means. A lower polarizing plate is positioned rotatively between the lamps and the liquid crystal cells. An upper polarizing plate is disposed at upper portions of the liquid crystal cells. A projecting mirror for projecting the distribution of the liquid crystal is disposed obliquely on the upper polarizing plate. The investigator decides the distribution condition of the liquid crystal cells with the projecting mirror.

The aligning means includes a first rack and a second rack which are positioned up and down in parallel. Midway portions of the racks are engaged with a pinion and both ends of the racks are connected to a first slider and a second slider. Especially, one end of the first rack is fixed on the first slider and the other end of the first rack is inserted movably in the second slider. On the other hand, one end of the second rack toward the same direction with the end of first rack is inserted movably in the first slider, and the other is fixed on the second slider. Accordingly, if one rack is moved in the left or right, i.e. in a horizontal way, the other rack is moved opposite to the moving direction according to the engagement operation through the pinion. A third rack and a fourth rack are positioned up and down onto the first and second sliders and they are also engaged with a pinion. Four putting arms are installed at both ends of the third and fourth racks. Corners of the liquid crystal cell are laid on the four putting arms. The connecting mechanism between the putting arms and both ends of the third and fourth racks is similar to those between the first and second racks, and the first and second sliders. A sensor for sensing the liquid crystal cell is installed at one among the four putting arms so that the robot unit is controlled in accordance with the sensing means.

A sensor bracket is installed at a slider positioned at an entrance to which the robot unit enters. A light emitting sensor and a light receiving sensor are attached to the sensor bracket up and down so that the entering position of the robot unit is controlled by sensing the size of the liquid crystal cell.

The test unit for end seal includes a base having first and second racks which are positioned up and down in parallel at a front side of the base. The first and second racks are engaged with a pinion. Both ends of the first and second racks are also fixed or movably connected to the first and second sliders similar to the structure in the test unit for liquid crystal. A pair of stoppers are installed at the first and second sliders so that corners of one side of the liquid crystal cell are supported by the stoppers. Putting arms in which the liquid crystal cell is to be laid thereon, are positioned orthogonal to the respective stoppers so that the corners of the one side of the liquid crystal cell are laid on the putting arms and simultaneously supported by the stoppers.

In the back side of the base, a bracket is installed. A third rack and a fourth rack are installed in parallel horizontally. As described, both ends of the third and fourth racks are fixed or movably connected to the third and fourth sliders. Another putting arms that corners of the other side of the liquid crystal cell are to be laid thereon, are installed at the third and fourth sliders. A sensor is installed at one among the putting arms so that the liquid crystal cell is sensed by the sensor. On the other hand, an air cylinder is installed on the bracket and a pusher is attached to a rod of the air cylinder so that the liquid crystal cell is closely contacted to the stoppers by the pusher.

A robot of x-axis is movably disposed on one side of the base, another robot of y-axis is further installed on the robot of x-axis. A photographing means is installed at the robot of y-axis so as to photograph the liquid crystal injecting holes. The means for photographing has a charge-coupled device (CCD) camera. A lens body is connected to a bottom of the CCD camera. A means for lighting is installed at the side of the lens body, and a prism which transfers the light incident from the lighting means by 90 degrees and reflects the light toward the lower portion thereto in an orthogonal way, is disposed within the lens body. A photographed image of the liquid crystal injecting hole is extended by a selected rate of magnification and displayed on a monitor which is separately provided. In the meantime, a reflecting mirror is disposed between the base and the liquid crystal cell so as to decrease leaking the light incident from the lighting means.

According to the above constitutions, two systems, i.e. the testing systems for liquid crystal and end seal are installed within one system, and the respective testing procedures are performed successively by loading the liquid crystal cell with the robot units into the respective testing units. Furthermore, the investigator has reduced eyestrain since the investigator tests the liquid crystal cells with the extended monitor.

BRIEF DESCRIPTION OF THE DRAWINGS

FIGS. 4 to 6 are plan views showing the arrangement of liquid crystal testing unit, the main parts of the present invention.

DETAILED DESCRIPTION OF THE PREFERRED EMBODIMENTS

Figure 1:
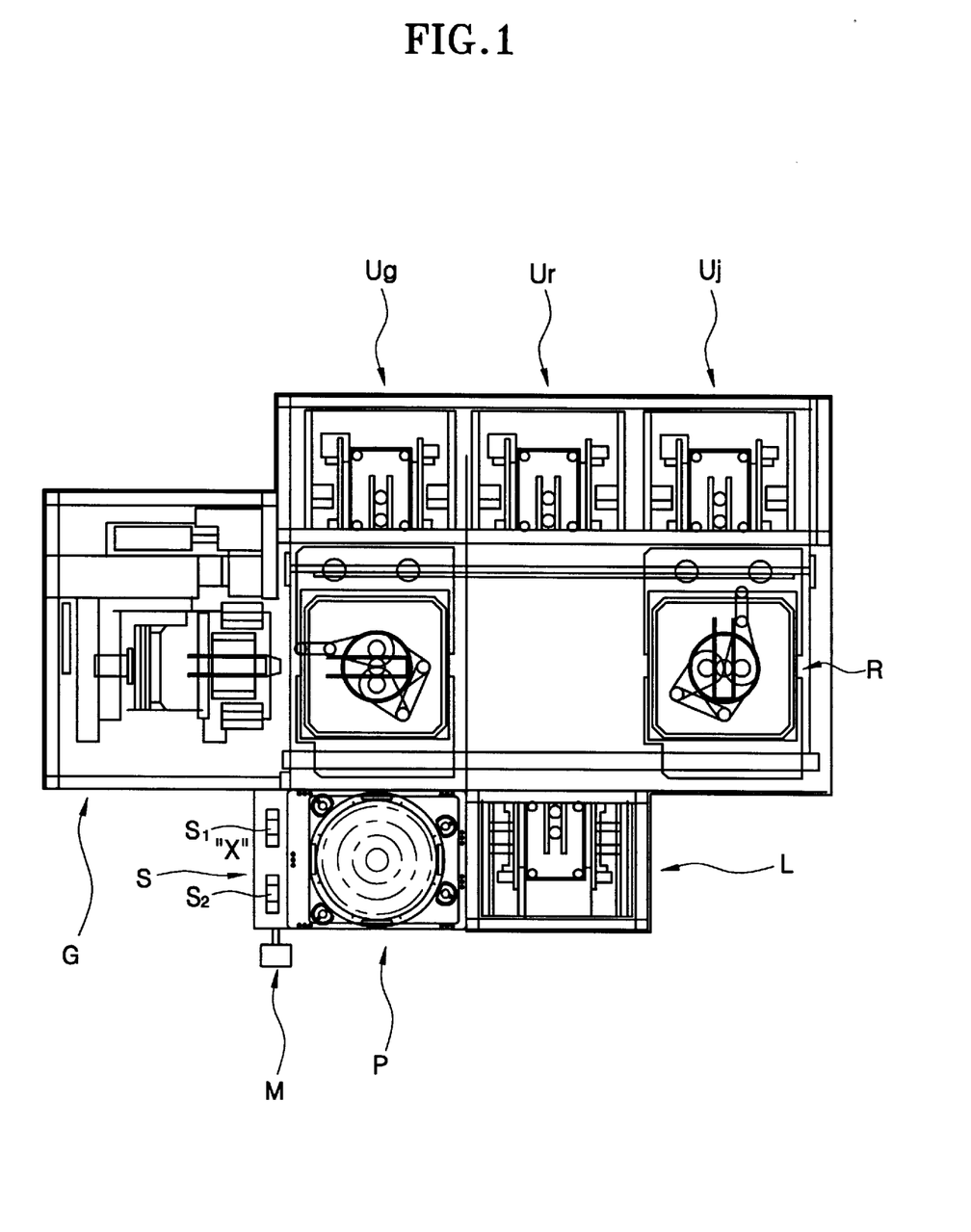
FIG. 1 is a plan view of a testing system according to the present invention.

As shown in FIG. 1, a testing system according to the present invention comprises: a loading unit L that a cassette enclosing liquid crystal cells is loaded therein; a liquid crystal testing unit P disposed at one side of the loading unit L for testing distribution of liquid crystal injected through a liquid crystal injecting hole; an end seal testing unit G disposed at one side of the liquid crystal testing unit P in an orthogonal position, so as to test end seal used for sealing the liquid crystal injecting hole; unloading units Ug, Ur, Uj that liquid crystal cells being decided and classified as good, repair, reject by the respective testing units P,G are unloaded therein; and a robot unit R for selectively transferring the liquid crystal cells one by one to the respective units.

Herein, the respective unloading units Ug, Ur and Uj are spaced by a selected distance in parallel with the loading unit L and the liquid crystal testing unit P, and the robot unit R is disposed movably therebetween.

On the other hand, only one investigator is required according to the present testing system and his location is shown as "X" in FIG. 1. An operating panel S which is located at front side of the "X" position, controls operations of the respective testing units P,G. The operating panel S includes a pair of switches S1,S2 having three buttons respectively so that liquid crystal cells being classified by the liquid crystal and end seal testing results as good, repair and reject are selectively transferred to their corresponding unloading units Ug,Ur,Uj. By pushing those switches S1,S2 selectively, the investigator makes the robot unit R unload the liquid crystal cells into the respective unloading units Ug,Ur,Uj.

Hereinafter, detailed description of the constitutions of the liquid crystal testing unit P and the end seal testing unit G are now made with reference to attached drawings.

Figure 2:
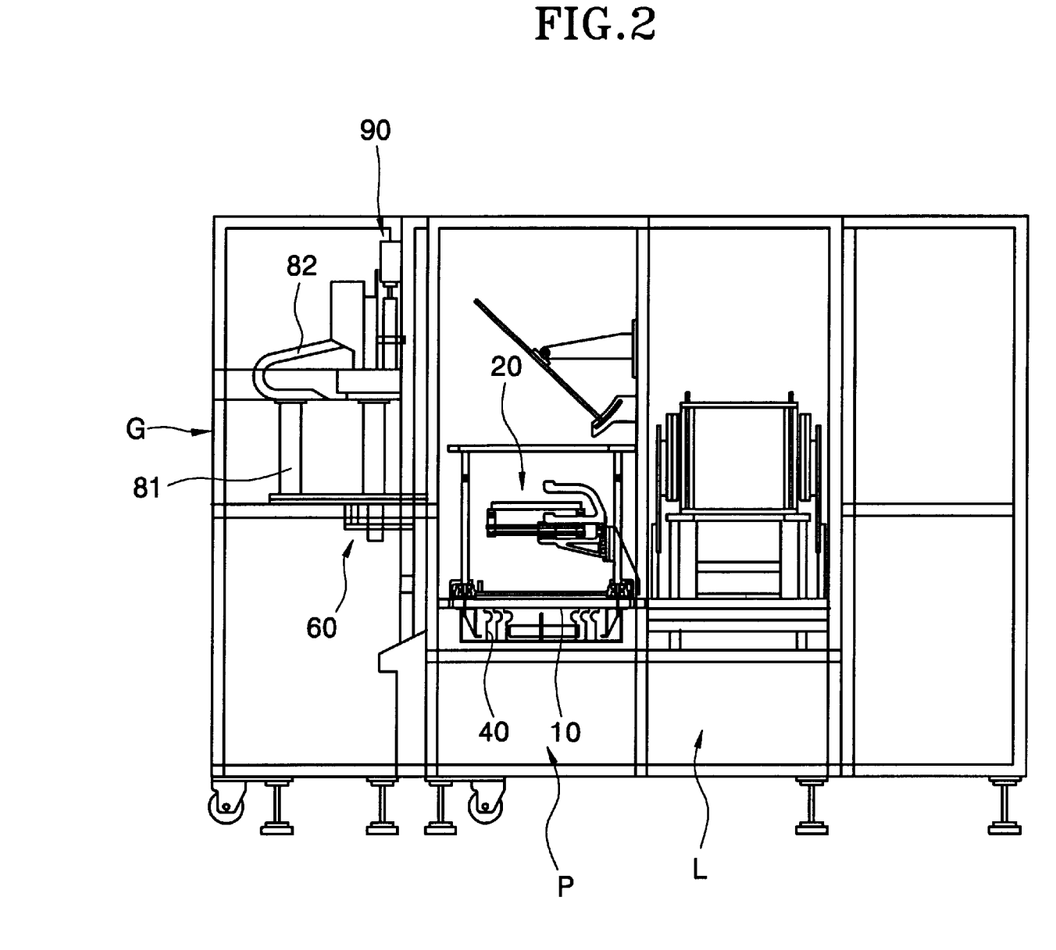
FIG. 2 is a front perspective view of the testing system according to the present invention.

The liquid crystal testing unit P is shown in FIG. 2. As described, there is provided an aligning means 20 for aligning the liquid crystal cell within a main frame 10. A lighting means 40 is disposed at upper and lower portions of the aligning means 20. The lighting means 40 emits light toward a bottom portion of the liquid crystal cell so that the liquid crystal distribution is tested by naked eyes of the investigator being positioned at the location "X".

Figure 4:
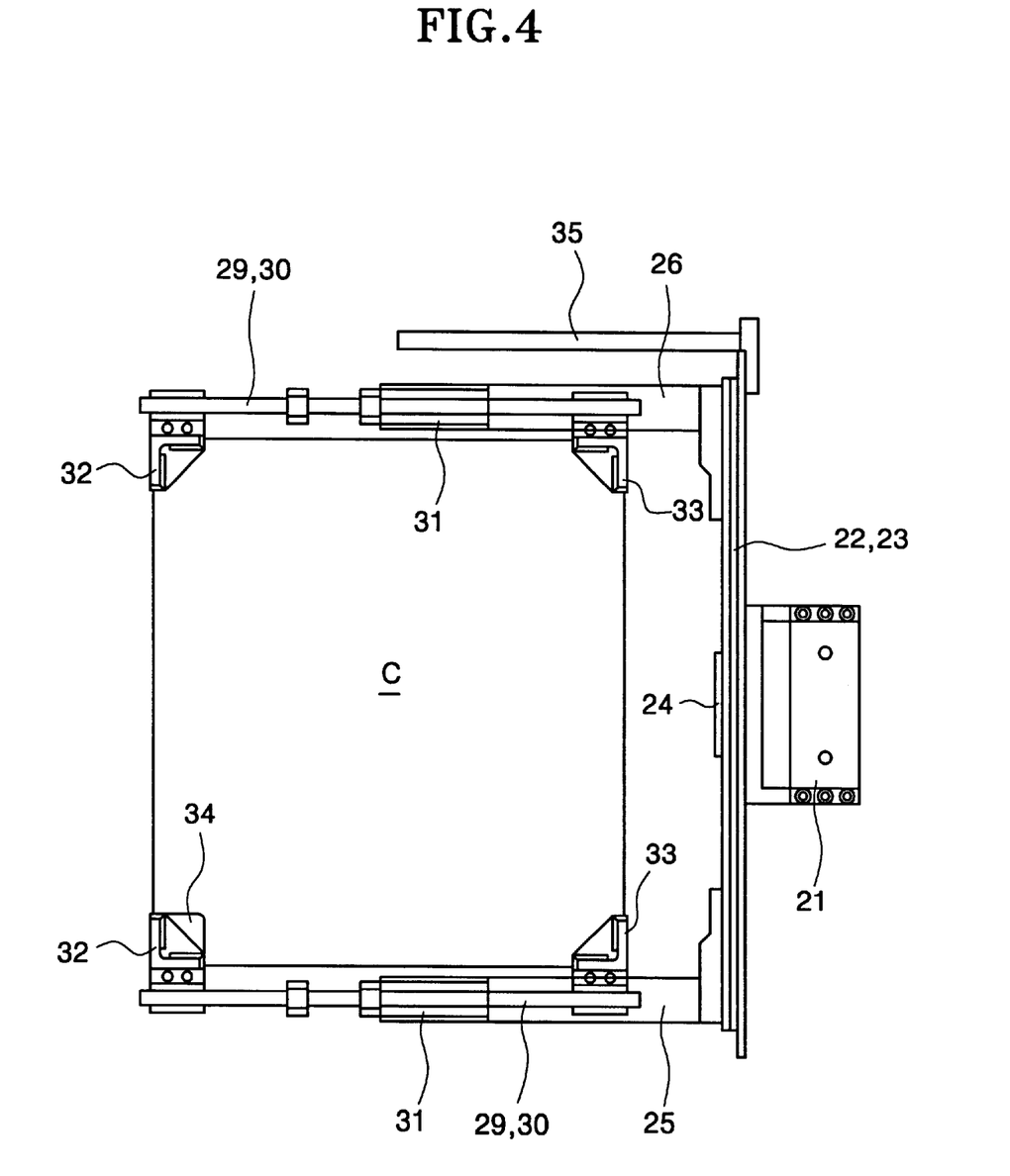
Figure 5:
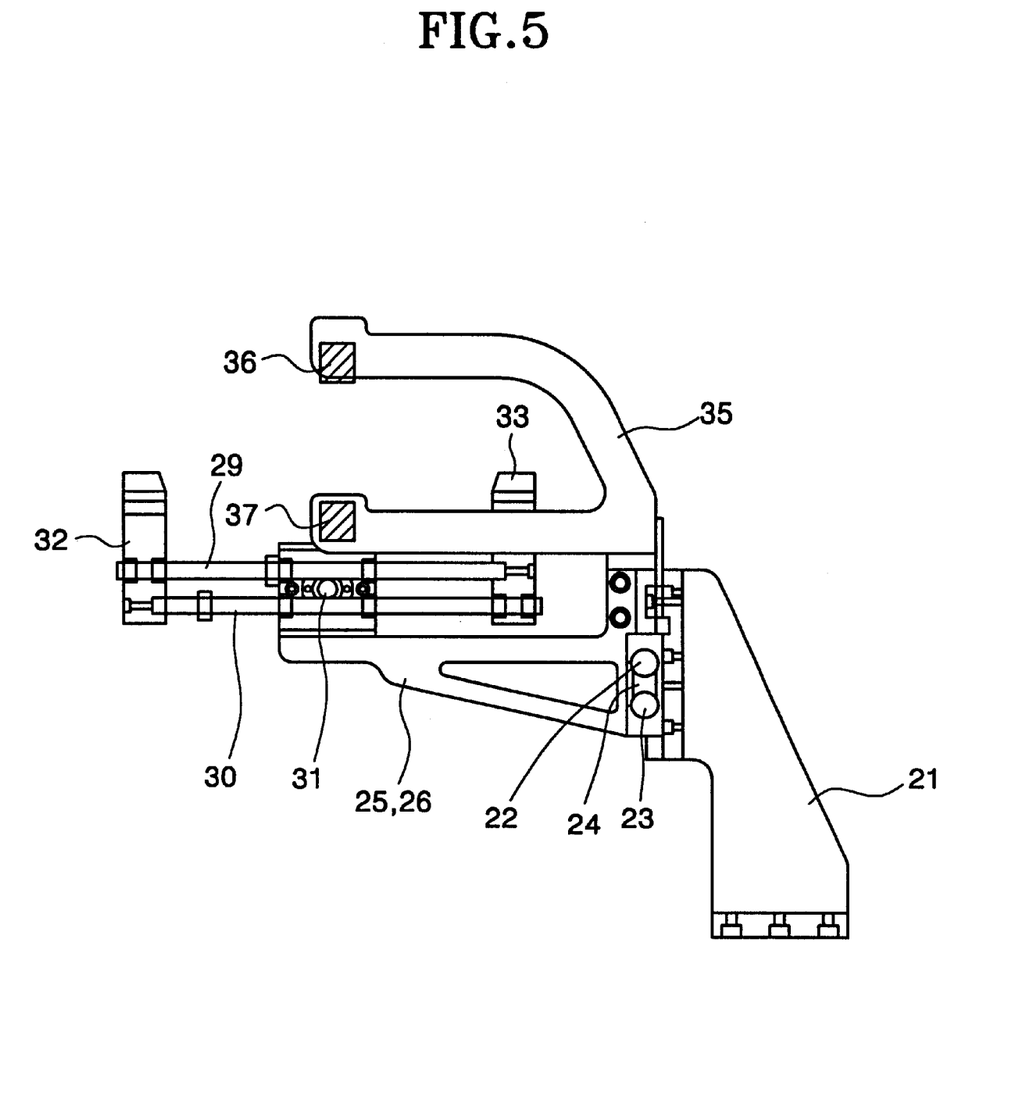
FIG. 5 is a front view of FIG. 4.
Figure 6:
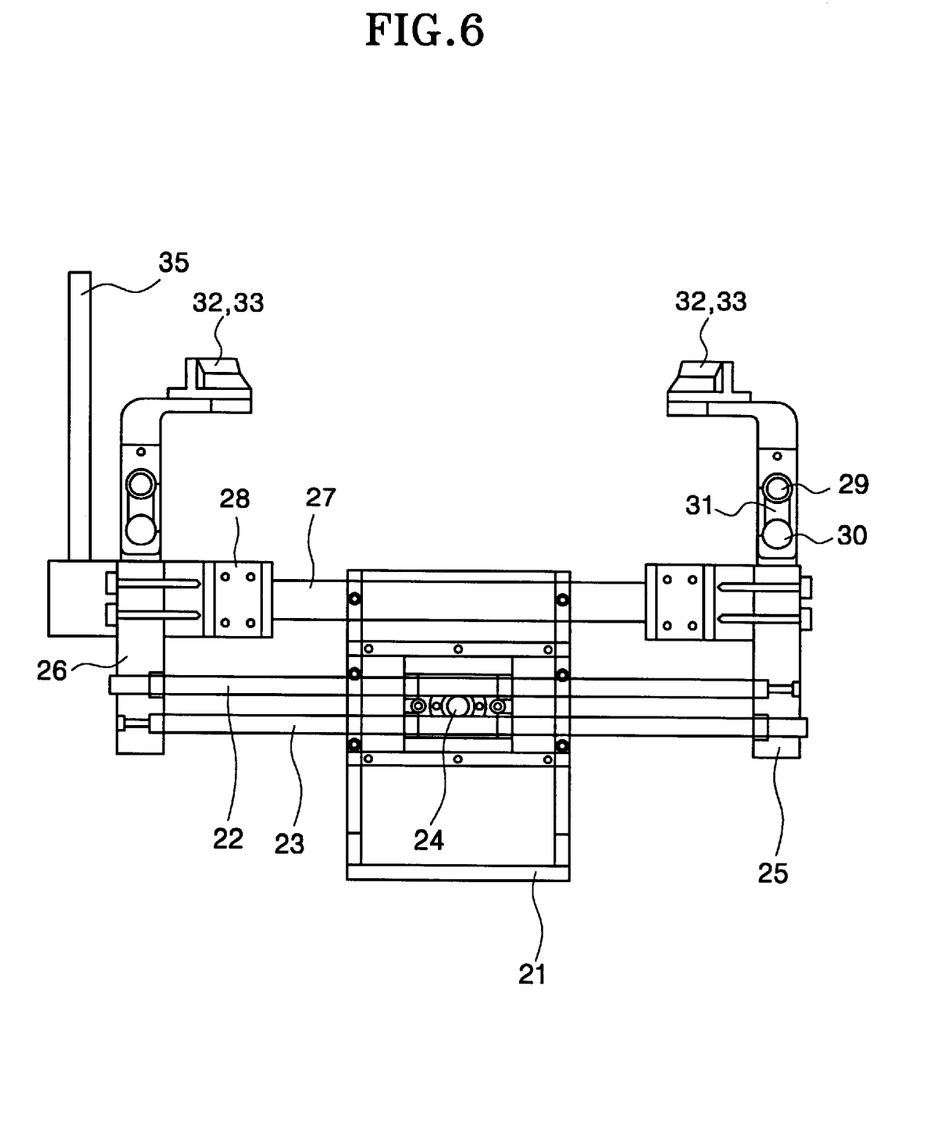
FIG. 6 is a left side perspective view of FIG. 4.

Detail of the aligning means 20 is illustrated in FIG. 4 to FIG. 6. As shown in the drawings, a hanger bracket 21 is installed at a side-wall of the main frame 10. A first rack 22 and a second rack 23 are installed at the hanger bracket 21 such that they are opposed in parallel and they can move in the horizontal way. In FIG. 6, the upper rack is the first rack 22 and the lower rack is the second rack 23. Between two racks 22,23, a pinion 24 is positioned thereby engaging the first and second racks 22,23. The pinion 24 is supported rotatively by the hanger bracket 21 so that the first and second racks 22,23 are moved in opposite directions according to the pinion rotation at its regular position.

Two sliders 25,26 are connected to both ends of the racks 22,23 in the orthogonal position with respect to the racks 22,23. In FIG. 6, a first slider 26 is positioned in the left and the left end of the first rack 22 is fixed on the first slider 26, while the left end of the second rack 23 is movably inserted in the same. On the other hand, a second slider 25 is positioned in the right and the right end of the first rack 22 is movably inserted in the second slider 25 on the contrary to the left end of the first rack 22 while the right end of the second rack 23 is fixed on the second slider 25. According to this connecting method, the first and second sliders 26,25 can move along the moving direction of the first and second racks 22,23. To support the relative motion of the first and second racks 22,23 being performed in parallel, a guide shaft 27 is disposed parallel to the upper portion of the racks 22,23 and fixed on the hanger bracket 21. A guide 28 being fixed on the first and second slider 26,25 is movably inserted in the guide shaft 27.

Furthermore, a third rack 29 and a fourth rack 30 are opposed in parallel each other and movably installed on the first and second sliders 26,25 in the horizontal way. Similar to the first and second racks 22,23, the third and fourth racks 29,30 are engaged with a pinion 31 which is rotatively supported on the first and second sliders 26,25. Putting arms 32,33 are provided on four locations i.e. both ends of the third and fourth racks 29,30. Four corners of the liquid crystal cell C are laid on the four putting arms 32,33. In the meantime, a sensor 34 for sensing the putting of liquid crystal cell C is attached to the putting arm 32 being disposed at the lower left portion among those putting arms 32,33 as shown in FIG. 4. According to a signal from the sensor 34, loading operation of the robot unit R is stopped.

On the other hand, every liquid crystal cell C can not be set in the correct location when the liquid crystal cell C is unloaded from the cassette by the robot unit R. Under that situation, the liquid crystal cell C is not laid precisely on the putting arms 32,33. To prevent the foregoing problem, the present invention employs a light emitting sensor 36 and a light receiving sensor 37 for sensing the size of the liquid crystal cell C. Namely, referring to FIG. 5, a sensor bracket 35 shown like a shape "C" is installed on the left slider 26 to which the robot unit R enters. The light emitting sensor 36 is attached to the upper portion of the sensor bracket 35 and the light receiving sensor 37 is attached to the lower portion of the sensor bracket 35. The size of liquid crystal cell C is measured by the light emitting sensor 36 and the light receiving sensor 37 thereby controlling the robot unit R entering position accurately.

Figure 7:
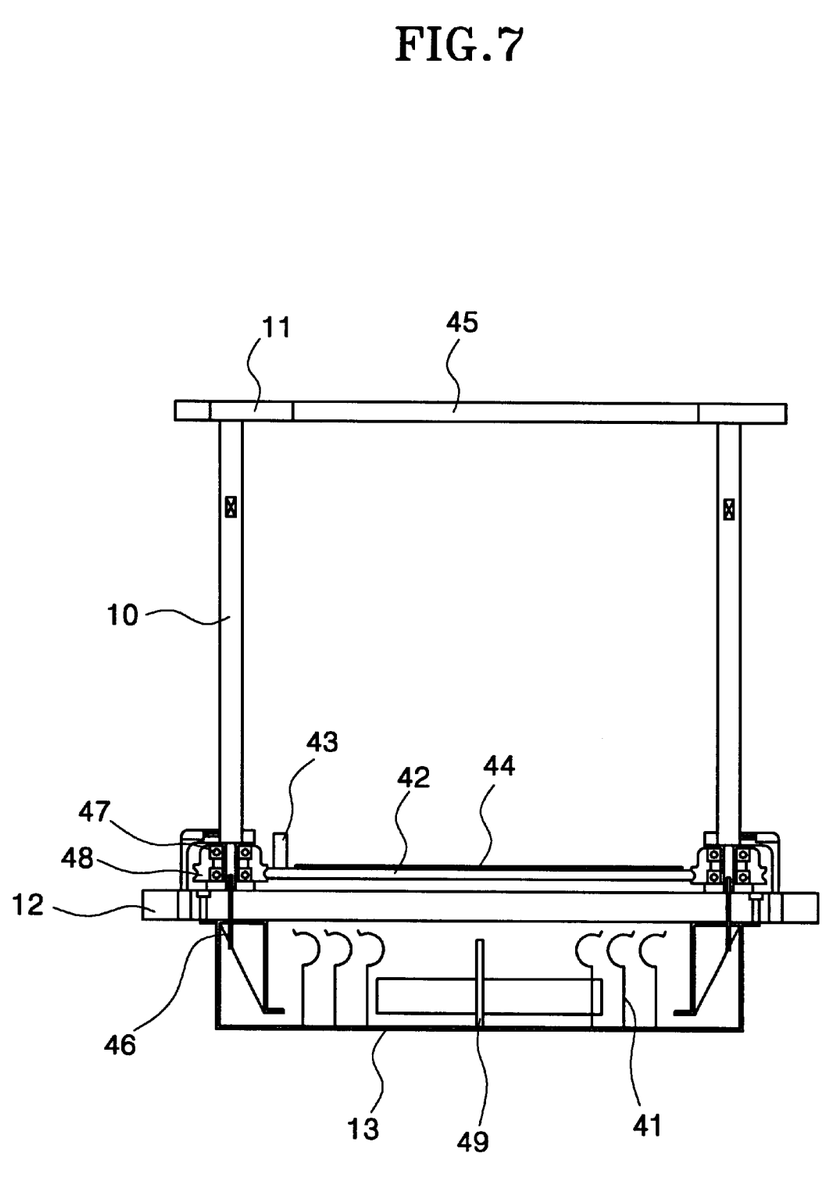
FIG. 7 is a front view of a lighting means of the liquid crystal testing unit of the present invention.
Figure 8:
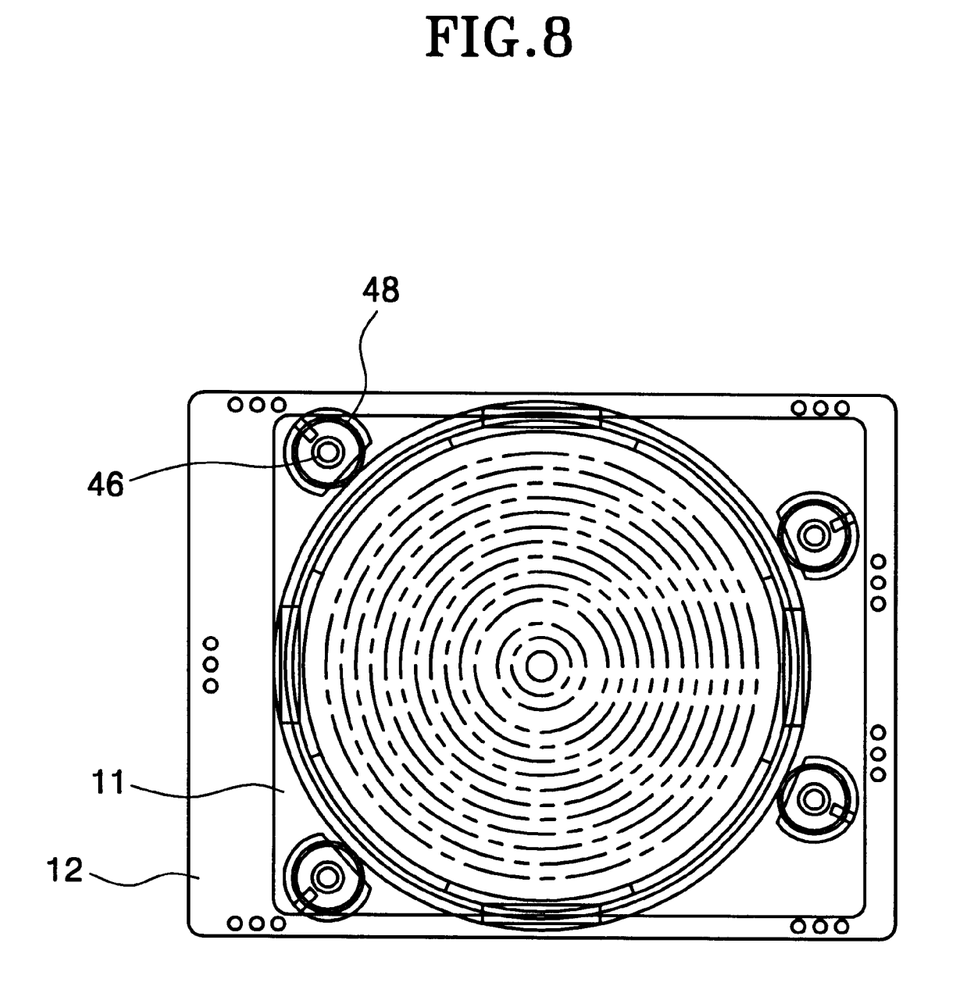
FIG. 8 is a plan view of FIG. 7.

FIG. 7 shows lighting means 40 being provided on the main frame 10. As shown in the drawing, an upper plate 11 and a lower plate 12 are installed at top and bottom of the main frame 10 respectively. A lamp bracket 13 is installed at the lower portion of the lower plate 12. A shaft 45 is inserted in the center of the lamp bracket 13, and a plurality of lamps 41 are arranged in centering around the shaft 49. A disc 42 is positioned on the lower plate 12 such that the disc 42 is rotatively inserted in the shaft. As shown in FIG. 8, outer circumference of the disc 42 is supported by four guide rollers 48 being disposed with a regular spacing. The guide rollers 48, as shown in FIG. 7, are rotatively supported by bearings 47 being inserted in a shaft 46 of the lower plate 12. A handle 43 is installed on the disc 42 for the sake of an easy rotation.

In the meantime, an upper polarizing plate 45 and a lower polarizing plate 44 are employed in the present invention for testing the liquid crystal distribution according to the theory that when both polarizing plates 45,44 are positioned in parallel on the same shaft, an incident light is transmitted while the polarizing plates 45,44 are obliquely set, therefore the transmittance decreases. Further, when they met in the orthogonal position, there is no light transmission.

According to the above theory, the lower polarizing plate 44 is installed on the disc 42 and the lower polarizing plate 44 can be rotated together with the disc 42. On the other hand, the upper polarizing plate 45 is fixed within the upper plate 11. Therefore, the injecting state of liquid crystal is tested by rotating the lower polarizing plate 44 thereby adjusting the light transmittance.

Figure 9:
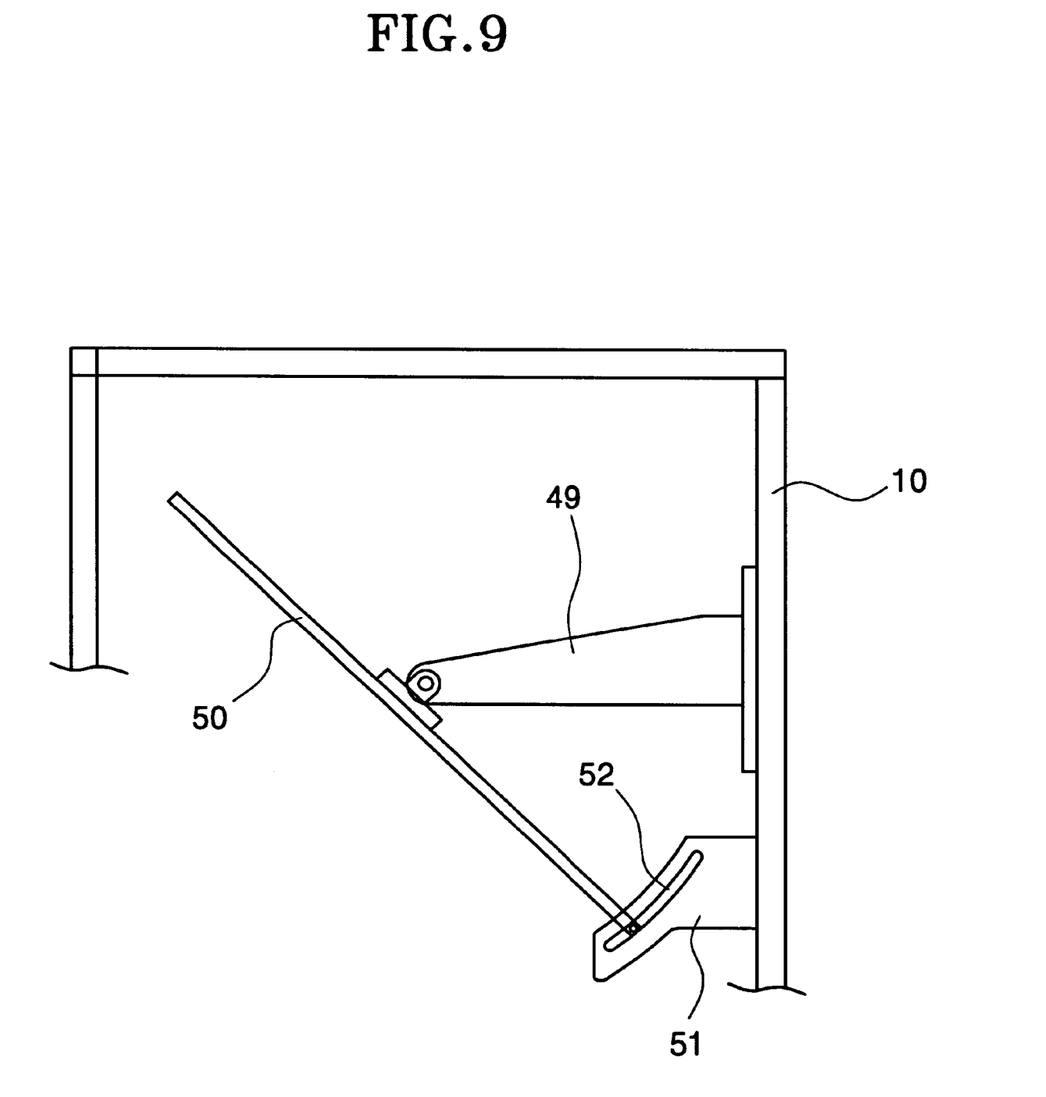
FIG. 9 is an extended view showing a projecting mirror of the liquid crystal testing unit.

Since the light passing the upper polarizing plate 45 as described above is turned upward orthogonal thereto, the projecting mirror 50 makes the investigator view the light with his naked eyes more easily. FIG. 9 shows a structure that the projecting mirror 50 is arranged.

As shown in the drawing, a hinge bracket 49 is installed at one side-wall of the main frame 10. The central portion of the projecting mirror 50 is connected to the hinge bracket 49 by a hinge 53. A lower portion of the projecting mirror 50 is rotatively connected to a guide bracket 51 which is installed at the main frame 50. That means, there is formed a guide slot 52 in the guide bracket 51 having a rotating curvature corresponding to that of the projecting mirror 50. By movably inserting the projecting mirror 50 into the guide slot 52, it is possible that angle of the projecting mirror 50 is adjusted to the level of investigator's sight.

Figure 3:
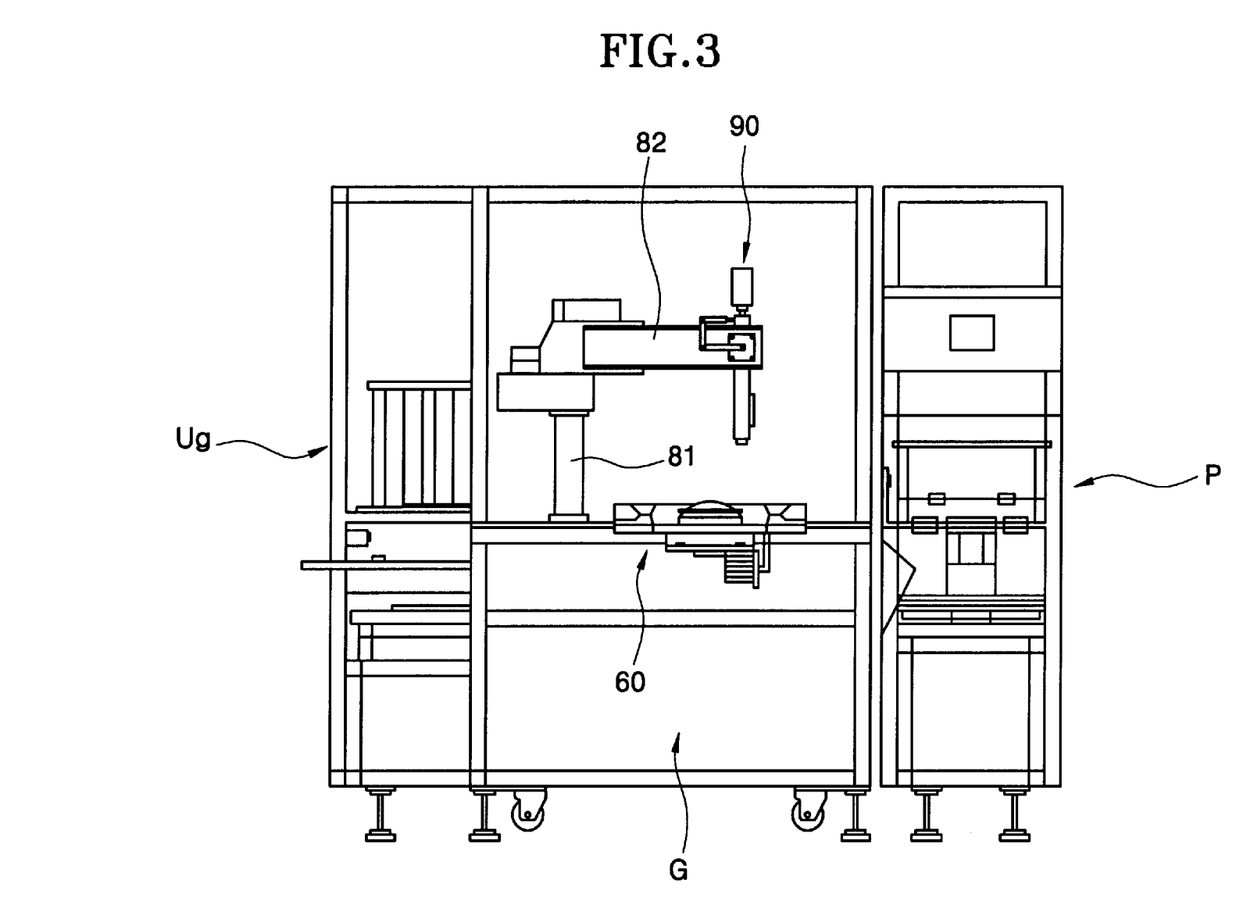
FIG. 3 is a left side perspective view of the testing system according to the present invention.

FIG. 3 shows a testing unit G for end seal used for sealing the liquid crystal injecting hole. As shown in the drawing, a robot 81 of x-axis is movably disposed at one side of a unit 60 for aligning the laid liquid crystal cell C. A robot 82 of y-axis is installed at the robot unit 81 of x-axis. A means 90 for photographing and magnifying the image of liquid crystal injecting hole is installed at the robot 82 of y-axis, and is moved in the horizontal way according to moves of the respective robots 81,82. Herein, it is well known that the robots 81,82 are operated by a lead screw and a motor, therefore detailed description including drawings are omitted.

Figure 10:
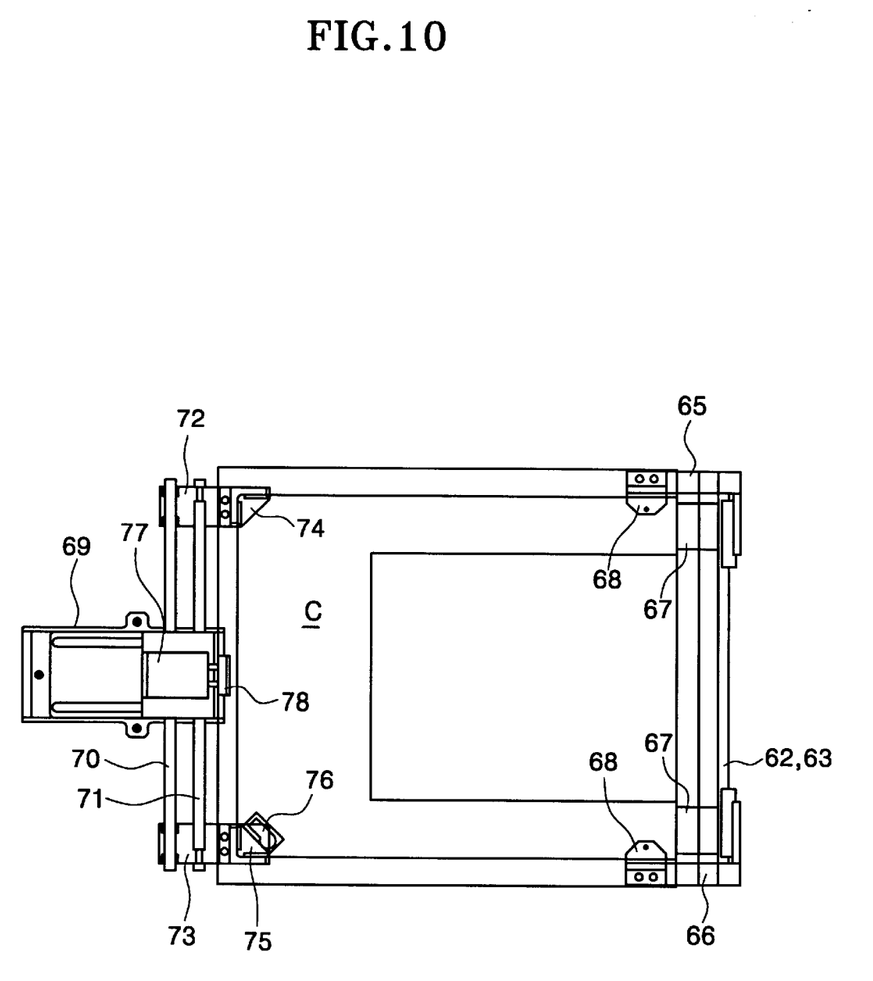
FIG. 10 a plan view of an end seal testing unit, the main parts of the present invention.
Figure 11:
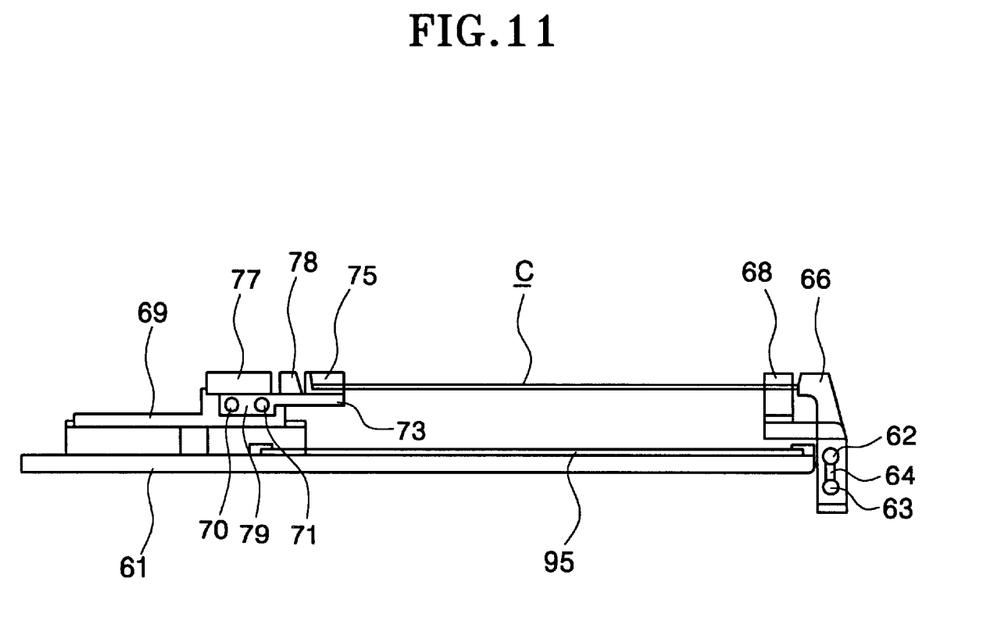
FIG. 11 is a front perspective view of FIG. 10.

FIGS. 10 and 11 show the aligning unit 60 in detail. As shown in the drawings, first and second racks 62,63 are positioned in parallel up and down at the front side of a base 61 that is an entering position of the robot unit R. A pinion 64 is installed between the first and second racks 62,63 thereby engaging those racks 62,63. Both ends of the first and second racks 62,63 are connected to first and second sliders 65,66. Herein, said connection is similar to the connection between racks and sliders of the test unit P for liquid crystal cell C. Detailed description regarding the connection is omitted.

A pair of stoppers 67 are installed at both ends of the first and second sliders 65,66. A pair of putting arms 68 are installed at the outermost ends of the first and second sliders 65,66. Corners of one side of the liquid crystal cell C are set in the respective putting arms 68 and simultaneously supported by the respective stoppers 67.

Accordingly, a means for pushing the liquid crystal cell C toward the stoppers 67 and a means for supporting the other side of the liquid crystal cell C are provided in the back side of the base 61. A bracket 69 is installed at the back of the base 61, and third and fourth racks 70,71 are movably installed within the bracket 69. The third and fourth racks 70,71 are engaged with a pinion 79. According to the same connecting mechanism as described above, the third and fourth racks 70,71 are connected to third and fourth sliders 72,73. A pair of putting arms 74,75 where corners of the other side of the liquid crystal cell C are to be laid, are installed at the third and fourth sliders 72,73. On the other hand, a sensor 76 is attached to one among the putting arms 74,75, and the operation of the robot unit R is controlled by a signal transmitted from the sensor 76. Further, an air cylinder 77 is provided on the bracket 69. A pusher 78 is installed at a rod of the air cylinder 77 so that one side of the liquid crystal cell C is pushed by the pusher 78 and one side of the liquid crystal cell C is closely contacted to the respective stoppers 67.

Figure 12:
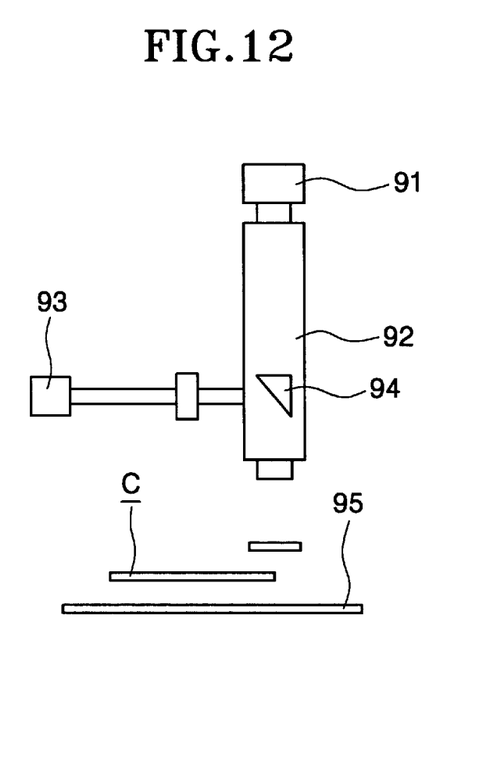
FIG. 12 is a schematic view showing a means for photographing, the main part of the end seal testing unit.

FIG. 12 shows an arrangement of photographing means 90. As shown in the drawing, a lens body 92 is connected to a bottom of a CCD camera 91. A lighting means 93 is installed at a side of the lens body 92. A prism 94 which transfers the light incident from the lighting means 93 by 90 degrees and reflects the light toward the lower portion thereto in the orthogonal way, is installed within the lens body 92. On the other hand, to improve the efficiency of the light that is emitted from the lighting means 93 and is also reflected to the CCD camera 91, a reflecting mirror 95 is installed on the base 61 being positioned in the lower portion of the liquid crystal cell C.

An extended view of the image photographed by the photographing means 90 as constituted above, is displayed on a monitor M which is installed at a side of the operating panel S as shown in FIG. 1. Accordingly, the investigator being positioned at the location "X" can test both the distribution of liquid crystal and end seal simultaneously. In the meantime, preferably the monitor M is installed to be adjustable to the level of investigator's sight.

Operation of the testing system as constituted above, is described hereinafter.

When the cassette enclosing the liquid crystal cell C is laid on the loading unit L, the robot unit R takes the liquid crystal cell C from the cassette one by one, and then moves toward the test unit P for liquid crystal.

Afterward, the liquid crystal cell C is entered into the aligning means 20 for liquid crystal test unit P by the robot unit R. Herein, four putting arms 32,33 are already arranged depending on the size of the liquid crystal cell C. That is to say, when the first rack 22 is moved to the left, the second rack 23 is moved to the right according to the engagement operation through the pinion 24. Therefore, the interval of the first and second sliders 25,26 becomes wider. Conversely, when the first rack 22 is moved to the right, the second rack 23 is moved to the left. Therefore, the interval of the first and second sliders 25,26 becomes narrower. Furthermore, the third and fourth racks 29,30 are moved according to the same way as described above, thereby adjusting the distances between the respective putting arms 32,33 suitable for the size of liquid crystal cell C.

Also, the location of the liquid crystal cell C on the robot unit R is sensed by the light emitting sensor 36 and the light receiving sensor 37 when the liquid crystal cell C is entered into the aligning means 20. The signal sensed by those light sensors is transmitted to the robot unit R and the robot is precisely controlled to be stopped at the point where the entering position of the robot unit R is coincided with the centers of the respective aligning arms 32,33.

As described above, when four corners of the liquid crystal cell C being aligned, are laid on the putting arms 32,33, which is sensed by the sensor 34 and a signal is transmitted to the robot unit R. And then, the robot unit R is returned to the starting point. The robot unit R is moved in front of the loading unit L again, and the robot unit R is prepared for the same operation as described above.

Continuously, the lamp 41 emits light toward the lower portion of the liquid crystal cell C. The light passes through the lower polarizing plate 44, the liquid crystal cell C and the upper polarizing plate 45 and the light is projected at the projecting mirror 50. Herein, the investigator holds the handle 43 being attached to the disc 42 and adjusts the axial direction of the lower polarizing plate 44 with the light transmittance. For instance, under the situation that axial directions of both upper and lower polarizing plates 45,44 are coincided with each other by adjusting the axial direction of the lower polarizing plate 44, empty spaces are formed locally if the liquid crystal is not distributed uniformly. Therefore, the light is transmitted through the empty spaces and is passed the upper polarizing plate 45 thereby showing the light in the projecting mirror 50.

The investigator decides the condition of liquid crystal distribution by viewing the projecting mirror 50 being set in the finest projecting angle condition. According to the result as tested, the investigator pushes a switch among the switches S1 provided on the operating panel S. When the repair switch is selected, the robot unit R is moved directly to the unloading stage Ur for repairing. That is, the robot unit skips the test unit G for end seal thereby unloading the liquid crystal cell C. When the reject switch is selected, similar to the repair switch, the liquid crystal cell C is unloaded to the unloading stage Uj for rejecting.

When the good switch is selected, the robot unit R transfers the liquid crystal cell C to the test unit G for end seal. According to the same operation as in the aligning means 20 of the test unit P for liquid crystal, the aligning means 60 of the test unit G for end seal is already set such that the four putting arms 68,74,75 are arranged depending on the size of the liquid crystal cell C. The four corners of the liquid crystal cell C is laid on the four putting arms 68,74,75. Afterward, the pusher 78 is pushed by the air cylinder 77 so that the liquid crystal cell C is closely contacted to the stopper 67. By doing so, the liquid crystal cell C is aligned.

The photographing means 90 is located at the upper portion of the liquid crystal injecting hole by the robots 81,82 of x-axis and y-axis, and the photographing means 90 photographs the liquid crystal injecting hole part thereby showing the extended image on the monitor M. Herein, the prism 94 transfers the incident light from the lighting means 93 by 90 degrees and reflects the light toward the camera 91 thereby improving the illumination. The monitor M shows more distinctive picture thereon.

The investigator decides the end seal condition as good, repair, reject by viewing the extended image of the liquid crystal injecting hole through the monitor M and the investigator pushes the corresponding switch S2. Accordingly, the investigator being positioned at the location X can test both the distribution of liquid crystal and end seal condition simultaneously.

And then, according to the selecting of corresponding switch, the robot unit R unloads the liquid crystal cell C to the unloading units Ug,Ur,Uj selectively.

According to the present invention as described above, the aligning means 20,60 are provided at the testing units P,G respectively. It is an effect of the present invention that the liquid crystal cell C is precisely aligned depending on the size of the liquid crystal cell C.

Furthermore, one investigator can conduct two tests at the same time by providing two units for testing liquid crystal and for end seal within one system thereby saving the manpower.

The investigator's eyestrain is reduced and the accuracy of the test is improved by providing an extended image on the monitor M when the sealing condition is tested by the investigator, compared to the conventional testing method using the microscope.

Various other modifications will be apparent to and can be readily made by those skilled in the art without departing from the scope and spirit of the present invention.

What is claimed is:

1. A system for testing a liquid crystal and an end seal of a liquid crystal cell comprising:
    a loading unit that a cassette enclosing the liquid crystal cells is loaded therein;
    a test unit for liquid crystal distribution disposed adjacent to the loading unit, wherein the liquid crystal is injected through a liquid crystal injecting hole, said test unit for liquid crystal comprising:
    a main frame;
    means for aligning the liquid crystal cell after being installed within the main frame, wherein the aligning means comprising:
        a hanger bracket installed at a side wall of the main frame;
        a first rack and a second rack opposed in parallel and supported movably at the hanger bracket in a horizontal way;
        a pinion engaging the first and second racks;
        a first slider and a second slider, wherein the first and second racks having respective ends are selectively fixed or movably connected to the first and second sliders, and an interval of said sliders becomes wider or narrower according to the moving direction of the first and the second racks;
        a third rack and a fourth rack movably supported by the first and second sliders in a horizontal way and installed up and down in parallel to dispose an orthogonal position with respect to the first and second racks;
        a pinion engaging the third and fourth racks;
        four putting arms, wherein the respective ends of the third and fourth racks are selectively fixed or movably connected to the putting arms, and intervals of said putting arms become wider or narrower according to the moving direction of the third and the fourth racks, and corners of the liquid crystal cell are laid on the four putting arms; and
        means for sensing attached to one among the putting arms, wherein the means for sensing controls the operation of the robot unit by sensing the liquid crystal cell;
    a means for emitting light toward a bottom of the liquid crystal cell being aligned by the aligning means and showing the liquid crystal distribution to an investigator by reflecting light;
    a test unit for end seal disposed adjacent to the loading unit, wherein the end seal seals the liquid crystal injecting hole;
    unloading units of good, repair, reject for unloading the liquid crystal cell disposed with a selected distance from the test unit for liquid crystal, wherein the liquid crystal cell is selectively unloaded according to a result from the respective test units;
    a robot unit for selectively transferring the liquid crystal cell to the respective units; and
    an operating panel disposed between the test units, wherein the operating panel comprises switches for deciding a transferring position of the liquid crystal cell depending on the test results.

2. The system of claim 1, further comprising a sensor bracket installed at the slider being positioned in the entering position of the robot unit, and a light emitting sensor and a light receiving sensor installed at the sensor bracket so as to control the entering position of the robot unit by sensing the size of the liquid crystal cell.

3. The system of claim 1, wherein the means for emitting comprises:
    lamps disposed at a lower portion of the main frame;
    an upper polarizing plate and a lower polarizing plate for selectively transmitting light incident from the lamps, wherein the lower polarizing plate is disposed between the lamps and the liquid crystal cell, and the upper polarizing plate is disposed at an upper portion of the liquid crystal cell; and
    a projecting mirror disposed on an upper portion of the upper polarizing plate and installed obliquely at the main frame, wherein the light incident from the lower polarizing plate, the liquid crystal cell, and the upper polarizing plate successively, is projected by the projecting mirror in a direction of an investigator.

4. The system of claim 3, further comprising a shaft installed at the center of a bottom of the main frame, wherein the lower polarizing plate is rotatively inserted to the shaft so that an axial direction of the lower polarizing plate can be adjustable by a selected degree.

5. The system of claim 3, wherein a midway portion of the projecting mirror is rotatively connected to a bracket being installed at the main frame and the bottom portion of the projecting mirror is movably inserted to a guide slot being formed in a guide bracket of the main frame so that angle of the projecting mirror can be adjusted to a level of a investigator's sight.

6. A system for testing liquid crystal and end seal of a liquid crystal cell comprising:
    a loading unit that a cassette enclosing liquid crystal cells is loaded therein;
    a test unit for liquid crystal distribution disposed adjacent to the loading unit, wherein the liquid crystal is injected through a liquid crystal injecting hole;
    a test unit for end seal disposed adjacent to the loading unit, wherein the end seal seals up the liquid crystal injecting hole, the test unit for end seal comprising:
        means for aligning the liquid crystal cell according to its size by pushing the liquid crystal cell;
        a robot unit of x-axis disposed at a side of the aligning means;
        a robot unit of y-axis installed at the robot unit of x-axis;

means for photographing installed at the robot unit of y-axis, and photographing the liquid crystal injecting hole part and magnifying the photographed image; and a monitor disposed at the operating panel so as to display the image photographed by the means for photographing;

unloading units of good, repair, and reject for unloading the liquid crystal cell disposed with a selected distance from the test unit for liquid crystal, wherein the liquid crystal cell is selectively unloaded according to a result from the respective test units;

a robot unit for selectively transferring the liquid crystal cell one by one to the respective units; and an operating panel disposed between the test units, wherein the operating panel comprises switches for deciding a transferring position of the liquid crystal cell depending on the test results.

7. The system of claim 6, wherein the aligning means comprises:

a base;

a first rack and a second rack opposed up and down at he front side of the base to which the robot unit enters;

a pinion engaged with the first and second racks;

a first slider and a second slider, wherein the respective ends of the first and second racks are selectively fixed or movably connected to the first and second sliders, and interval of said sliders becomes wider or narrower according to the moving direction of the first and the second racks;

putting arms installed at the first and second sliders, wherein corners of one side of the liquid crystal cell are laid on the putting arms;

a third rack and a fourth rack supported movably at the back side of the base in the horizontal way and disposed in parallel in the left and right;

a pinion engaged with the third and fourth racks;

a third slider and a fourth slider, wherein the respective ends of the third and fourth racks are selectively fixed or movably connected to the third and fourth sliders, and interval of said sliders becomes wider or narrower according to the moving direction of the third and fourth racks; and putting arms installed at the third and fourth sliders, wherein corners of the other side of the liquid crystal cell are laid on the putting arms.

8. The system of claim 7, further comprising: a pair of stoppers installed at the first and second sliders wherein one side of the liquid crystal cell is closely contacted to the stoppers; an air cylinder installed at the back side of the base; and a pusher installed at a rod of an air cylinder wherein the pusher pushes the other side of the liquid crystal cell thereby contacting one side of the liquid crystal cell close to the stoppers.

9. The system of claim 7, further comprising a reflecting mirror disposed between the base and the liquid crystal cell, wherein the reflecting mirror reflects the light incident from the means for photographing upwardly orthogonal thereto.

10. The system of claim 6, wherein the monitor is rotatively connected to the operating panel so that the location of the monitor is adjustable to the level of the investigator's sight.

* * * * *